(12) United States Patent
Carlsson

(10) Patent No.: US 11,254,361 B2
(45) Date of Patent: Feb. 22, 2022

(54) STEER-BY-WIRE SYSTEMS AND METHODS PROVIDING TIRE FORCE BUILDUP COMPENSATION

(71) Applicant: Volvo Car Corporation, Gothenburg (SE)

(72) Inventor: Pontus Carlsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 221 days.

(21) Appl. No.: 16/362,839

(22) Filed: Mar. 25, 2019

(65) Prior Publication Data

US 2020/0307690 A1    Oct. 1, 2020

(51) Int. Cl.
| | | |
|---|---|---|
| *B62D 15/02* | (2006.01) | |
| *B62D 5/00* | (2006.01) | |
| *B62D 5/04* | (2006.01) | |
| *B62D 6/00* | (2006.01) | |

(52) U.S. Cl.
CPC ........... *B62D 15/021* (2013.01); *B62D 5/001* (2013.01); *B62D 5/0457* (2013.01); *B62D 6/002* (2013.01)

(58) Field of Classification Search
None
See application file for complete search history.

(56) References Cited

U.S. PATENT DOCUMENTS

| | | | |
|---|---|---|---|
| 7,526,372 B2 | 4/2009 | Tsutsumi et al. | |
| 7,832,522 B2 | 11/2010 | Akuta et al. | |
| 7,908,056 B2 | 3/2011 | Hwang | |
| 9,771,102 B2 | 9/2017 | Sakurai | |
| 10,183,697 B2 | 1/2019 | Lee | |
| 2008/0243339 A1* | 10/2008 | Nishimori | B60G 7/003 701/41 |

(Continued)

FOREIGN PATENT DOCUMENTS

| | | |
|---|---|---|
| EP | 2960139 A1 | 12/2015 |
| JP | 20050239031 A1 | 9/2005 |
| WO | 2012076805 A1 | 6/2012 |

OTHER PUBLICATIONS

Jul. 16, 2020 European Search Report issued on International Application No. 20160669.

*Primary Examiner* — Jonathan M Dager
*Assistant Examiner* — Garrett F Evans
(74) *Attorney, Agent, or Firm* — Clements Bernard Walker; Christopher L. Bernard

(57) ABSTRACT

A steer-by-wire system and method for a vehicle, including and utilizing: a steering wheel system including a steering wheel, an angle sensor or mechanism coupled or applied to the steering wheel and for determining an angular magnitude of the steering wheel and provide a corresponding control signal, and an angular rate sensor or mechanism coupled or applied to the steering wheel and for determining an angular rate of the steering wheel and provide a corresponding control signal offset; and a steering actuator system including a wheel angle actuator coupled to one or more wheels of the vehicle and for receiving the collective control signal and control signal offset and turning the wheels in response. The steering wheel system further includes an angular rate filter/tuner for receiving an angular rate input from the angular rate sensor or mechanism and deriving an angular offset output corresponding to the control signal offset.

20 Claims, 3 Drawing Sheets

(56) References Cited

U.S. PATENT DOCUMENTS

2010/0250068 A1    9/2010  Yamazaki
2017/0144705 A1    5/2017  Lee
2020/0223270 A1*   7/2020  Kunkel .................. B60G 7/006

* cited by examiner

STEER-BY-WIRE SYSTEMS AND METHODS PROVIDING TIRE FORCE BUILDUP COMPENSATION

TECHNICAL FIELD

The present disclosure relates generally to the automotive field. More specifically, the present disclosure relates to steer-by-wire systems (SBW) and methods providing tire force buildup compensation. These SBW systems and methods find particular applicability in the driver assist (DA) context.

BACKGROUND

As driver assist (DA) and autonomous driving (AD) systems are becoming more widespread and accepted, steer-by-wire (SBW) systems are becoming more prevalent in vehicles. Such SBW systems eliminate the conventional mechanical linkages that couple the steering wheel of a vehicle to the wheels that it steers, replacing these mechanical linkages with a plurality of electronic sensors, controllers, and actuators. For example, aircraft have used SBW systems for some time to overcome the large forces present on the various control surfaces and make the aircraft easier and more responsive to fly. A mechanical steering wheel input is converted an electrical signal, which is in turn converted to a mechanical wheel output. This can be thought of a power-assist steering taken to its logical conclusion.

FIG. 1 illustrates a conventional SBW system and method 10 for a vehicle. The steering wheel system 12 includes a steering wheel by which a driver steers the vehicle and an angle sensor 14 that senses a degree of rotation of the steering wheel. A control signal corresponding to the degree of rotation of the steering wheel, or steering wheel angle, is transmitted to a steering actuator system 22 including a wheel angle actuator 24 that is ultimately responsible for turning one or more wheels 50 of the vehicle to the degree indicated by the control signal corresponding to the degree of rotation of the steering wheel. Both the angle sensor 14 and the wheel angle actuator 24 are coupled to various processing and control systems associated with the collective vehicle processing unit 5. Of course, different scaling factors can be applied to the control signal to fine-tune the response of the one or more wheels 50 to the driver's steering request. It should also be noted that this may be applied in both two-wheel steering and four-wheel steering configurations.

One problem, however, is that the tire force buildup is not instantaneous. This can result in degraded handling and agility of the vehicle under certain operating conditions. The driver's steering request is not crisply executed as a precise wheel response. This problem is solved by the SBW systems and methods provided herein, which exploit the slip dynamics of the tire to provide a faster response by overshooting.

SUMMARY

In various exemplary embodiments, the present disclosure provides SBW systems and methods that apply an offset to the conventional control signal described above, such that the driver's steering request is more crisply executed as a precise wheel response and handling and agility of a vehicle are improved. In the steering wheel system, in addition to using an angle sensor that senses the degree of rotation of the steering wheel, an angular rate sensor is also used to sense the rate at which the steering wheel is rotated. This angular rate input is processed by an angular rate filter/tuner to generate an angular offset output that is fed forward to the control loop to modify the control signal. The control signal is the AngleRequest, which incorporates the angle plus the filter (i.e., rate). This modified control signal is then provided to the wheel angle actuator of the steering actuator system and used to control the response of the one or more wheels, front and/or rear. Thus, the response of the one or more wheels is more accurately fine-tuned to the driver's steering request, taking into account both degree and rate of rotation of the steering wheel.

Further, the modified control signal can be provided to a wheel camber actuator of the steering actuator system to camber the one or more wheels, if so desired, providing even greater vehicle responsiveness under certain conditions.

In one exemplary embodiment, the present disclosure provides a steer-by-wire system for a vehicle, including: a steering wheel system including a steering wheel, an angle sensor or mechanism coupled or applied to the steering wheel and adapted to determine a directed angular magnitude of the steering wheel and provide a corresponding control signal, and an angular rate sensor or mechanism coupled or applied to the steering wheel and adapted to determine a directed angular rate of the steering wheel and provide a corresponding control signal offset; and a steering actuator system including a wheel angle actuator coupled to one or more wheels of the vehicle and adapted to receive the collective control signal and control signal offset from the steering wheel system and turn the one or more wheels responsive to the collective control signal and control signal offset. The steering wheel system further includes an angular rate filter/tuner adapted to receive an angular rate input from the angular rate sensor or mechanism and derive an angular offset output corresponding to the control signal offset from the angular rate input. The angular rate filter/tuner includes a first or second order filter or the like with a response time and a gain, such as a vehicle speed-dependent filter, for example. Optionally, the steering actuator system further includes a wheel camber actuator coupled to one or more wheels of the vehicle and adapted to receive the collective control signal and control signal offset from the steering wheel system and camber the one or more wheels responsive to the collective control signal and control signal offset. Optionally, the angular rate filter/tuner is further adapted to modify the control signal offset based on a selected driving mode of the vehicle.

In another exemplary embodiment, the present disclosure provides a computer-readable medium having instructions stored thereon that, when executed by a processor, cause the processor to perform the following steps: receiving a directed angular magnitude of a steering wheel of a vehicle determined using an angle sensor or mechanism coupled or applied to the steering wheel and providing a corresponding control signal; receiving a directed angular rate of the steering wheel determined using an angular rate sensor or mechanism coupled or applied to the steering wheel and providing a corresponding control signal offset; and actuating a wheel angle actuator coupled to one or more wheels of the vehicle using the collective control signal and control signal offset to turn the one or more wheels responsive to the collective control signal and control signal offset. The instructions include an angular rate filter/tuner algorithm adapted to receive an angular rate input from the angular rate sensor or mechanism and derive an angular offset output corresponding to the control signal offset from the angular rate input. The angular rate filter/tuner algorithm includes a first or second order filter or the like with a response time and a gain, such as a vehicle speed-dependent filter, for example. Optionally, the steps further include: actuating a wheel camber actuator coupled to the one or more wheels using the collective control signal and control signal offset to camber the one or more wheels responsive to the collective control signal and control signal offset. Optionally, the angular rate filter/tuner algorithm is further adapted to modify the control signal offset based on a selected driving mode of the vehicle.

In a further exemplary embodiment, the present disclosure provides a steer-by-wire method for a vehicle, including: receiving a directed magnitude parameter of a steering control of the vehicle determined using a magnitude parameter sensor or mechanism coupled or applied to the steering control and providing a corresponding control signal; receiving a directed rate parameter of the steering control determined using an rate parameter sensor or mechanism coupled or applied to the steering control and providing a corresponding control signal offset; and actuating a wheel angle actuator coupled to one or more wheels of the vehicle using the collective control signal and control signal offset to turn the one or more wheels responsive to the collective control signal and control signal offset. The method further includes, using a rate parameter filter/tuner algorithm, receiving rate parameter input from the rate parameter sensor or mechanism and deriving rate parameter offset output corresponding to the control signal offset from the rate parameter input. The rate parameter filter/tuner algorithm includes a first or second order filter or the like with a response time and a gain, such as a vehicle speed-dependent filter, for example. Optionally, the method still further includes: actuating a wheel camber actuator coupled to the one or more wheels using the collective control signal and control signal offset to camber the one or more wheels responsive to the collective control signal and control signal offset. Optionally, the rate parameter filter/tuner algorithm is further adapted to modify the control signal offset based on a selected driving mode of the vehicle. Optionally, the magnitude parameter is one of an angular magnitude parameter and a linear magnitude parameter. Optionally, the rate parameter is one of an angular rate parameter and a linear rate parameter.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF EMBODIMENTS

Again, the present disclosure provides SBW systems and methods that apply an offset to the conventional control signal described above, such that the driver's steering request is more crisply executed as a precise wheel response and handling and agility of a vehicle are improved. In the steering wheel system, in addition to using an angle sensor that senses the degree of rotation of the steering wheel, an angular rate sensor is also used to sense the rate at which the steering wheel is rotated. This angular rate input is processed by an angular rate filter/tuner to generate an angular offset output that is fed back to the control loop to modify the control signal. This modified control signal is then provided to the wheel angle actuator of the steering actuator system and used to control the response of the one or more wheels, front and/or rear. Thus, the response of the one or more wheels is more accurately fine-tuned to the driver's steering request, taking into account both degree and rate of rotation of the steering wheel. Phase lead steering angle is fed forward when turning, resulting a a quicker vehicle response.

Further, the modified control signal can be provided to a wheel camber actuator of the steering actuator system to camber the one or more wheels, if so desired, providing even greater vehicle responsiveness under certain conditions.

Figure 2:
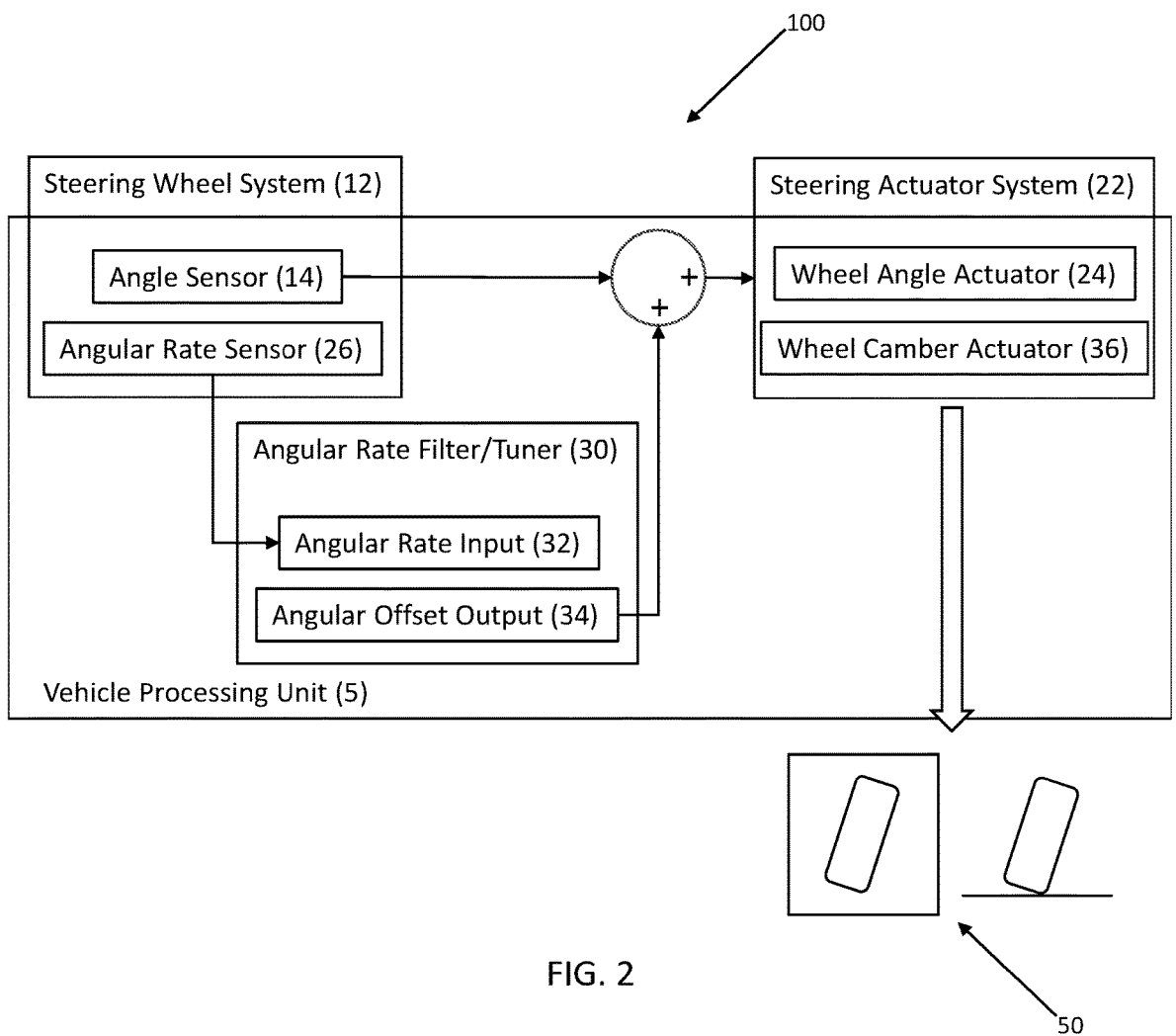
FIG. 2 is a schematic diagram illustrating the SBW system and method of the present disclosure, utilizing both steering wheel input angle and rate to control wheel angle and camber response of a vehicle.

FIG. 2 illustrates one exemplary embodiment of the SBW system and method 100 of the present disclosure. As is conventional, the steering wheel system 12 includes a steering wheel by which a driver steers the vehicle and an angle sensor 14 that senses a degree of rotation of the steering wheel. A control signal corresponding to the degree of rotation of the steering wheel, or steering wheel angle, is transmitted to a steering actuator system 22 including a wheel angle actuator 24 that is ultimately responsible for turning one or more wheels 50 of the vehicle to the degree indicated by the control signal corresponding to the degree of rotation of the steering wheel. Both the angle sensor 14 and the wheel angle actuator 24 are coupled to various processing and control systems associated with the collective vehicle processing unit 5. Of course, different scaling factors can still be applied to the control signal to fine-tune the response of the one or more wheels 50 to the driver's steering request. It should also be noted that this may be applied in both two-wheel steering and four-wheel steering configurations.

By way of example only, the angle sensor 14 can include any conventional or novel steering angle sensor (SAS) that is directly or indirectly coupled to the steering wheel axle. The SAS itself could use different technologies, but, as an example, it could be made using a pair of induction sensors and with smart gearing having different ratios to the angle being measured. In this way, an absolute sensor can be provided, since the combination of the pair of induction sensors will be able to define the precise revolution. Further, for the SBW system 100, the steering actuator system 22 should include an absolute sensor to determine the exact position/angle of the wheel/wheels. This becomes relevant if one includes the reason why the request is sent from the steering wheel system 12 to the steering actuator system 22—angle/position. The steering actuator system 22 should have an angle/position controller to actually actuate the request that is sent. The wheel angle actuator 24 can include an axle module or single wheel modules. The physical interface from a conventional steering system is the steering rods connected to the wheel hubs, which by position turn the wheels. The SBW system 100 typically uses electrical motor(s) to move the "rack" (which is the mechanical construction connecting left/right rods). The motor(s) are controlled by an electronic control unit (ECU) that receives communication commands via a network. The ECU's main responsibility is to move the wheels 50 into a position that is requested by the external system(s) and, for this purpose, a position controller is implemented. Further, there are additional functionalies to take care of tolerances and disturbances, such as imperfect wheel alignment, for example. The ECU also typically handles control of the wheel angle actuator 24. The external request in the SBW system 100 is some position or angle and the wheel angle actuator 24 controlling the wheel 50 includes an appropriate position/angle controller.

In the steering wheel system 22, in addition to using the angle sensor 14 that senses the degree of rotation of the steering wheel, an angular rate sensor 26 is also used to sense the rate at which the steering wheel is rotated. This angular rate input 32 is processed by an angular rate filter/tuner 30 to generate an angular offset output 34 that is fed back to the control loop to modify the control signal. This modified control signal is then provided to the wheel angle actuator 24 of the steering actuator system 22 and used to control the response of the one or more wheels 50, front and/or rear. Thus, the response of the one or more wheels 50 is more accurately fine-tuned to the driver's steering request, taking into account both degree and rate of rotation of the steering wheel.

By way of example only, the angular rate sensor 26 can include any mechanism, whether or physical or mathematical, that takes the angle of the steering wheel and determines or estimates the derivative (i.e., angular rate) by taking the difference over multiple angle samples and filters that data to provide the desired resolution and accuracy. The angular rate filter/tuner 30 derives the angular offset output 34 from the angular rate input 32 by, for example, combining the angle of the steering wheel with a second order transfer function of the angular rate as follows:

$$\text{Second order system: } T = \frac{K}{s^2 + 2\xi\omega_n s + \omega_n^2}$$

Angle + Filtered Angular Rate = Request $$1 + sT =$$

$$1 + \frac{sK}{s^2 + 2\xi\omega_n s + \omega_n^2} = \frac{s^2 + (2\xi\omega_n + K)s + \omega_n^2}{s^2 + 2\xi\omega_n s + \omega_n^2} = FeedForwardFilter$$

where K is the gain of the feed forward angular velocity, $\xi$ is the damping of the second order transfer function, and $\omega_n$ is the natural frequency of the second order transfer function. The transfer function should be multiplied with angle request. The angular offset output 34 can also be fed forward to the wheel angle actuator 24 separately, instead of as part of a combined control signal. This makes sense when the wheel angle actuator 24 utilizes a position controller. The external control signal can be added between that position controller and the wheel angle actuator 24 itself. The main idea is to make the vehicle feel more agile without affecting the trajectory of the vehicle too much. In this sense, the filter utilized preferably "leads" the steer angle.

Thus, the SBW system and method 100 provided herein counteract tire force buildup, which is faster for larger slip angles, such as with different tire configurations and at high speed. This improves handling and agility of the vehicle under certain operating conditions. The driver's steering request is crisply executed as a precise wheel response as a result. It should be noted that this multiple variable approach can be applied to other steering systems as well, aside from those incorporating a steering wheel, provided that both input magnitude and input rate information are utilized to provide a modified control signal and, ultimately, an enhanced wheel response.

As alluded to above, the modified control signal can also be provided to a wheel camber actuator 36 of the steering actuator system 22 to camber the one or more wheels 50, if so desired, providing even greater vehicle responsiveness under certain conditions. This is especially applicable to semi-AD vehicles currently being developed that utilize wheels that rotate, turn, and pivot to achieve a desired maneuver.

Figure 1:
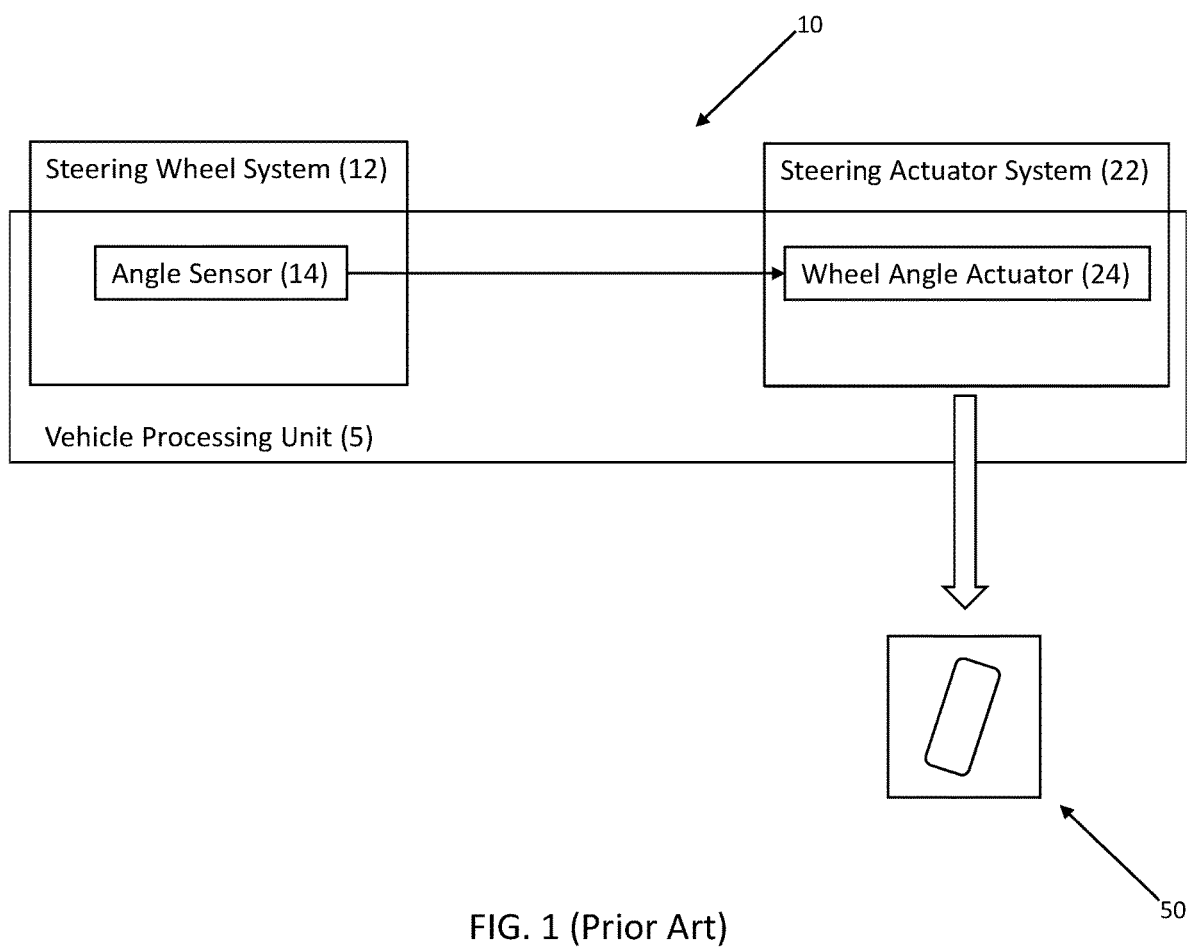
FIG. 1 is a schematic diagram illustrating a conventional SBW system and method, utilizing only steering wheel input angle to control wheel angle response of a vehicle.
Figure 3:
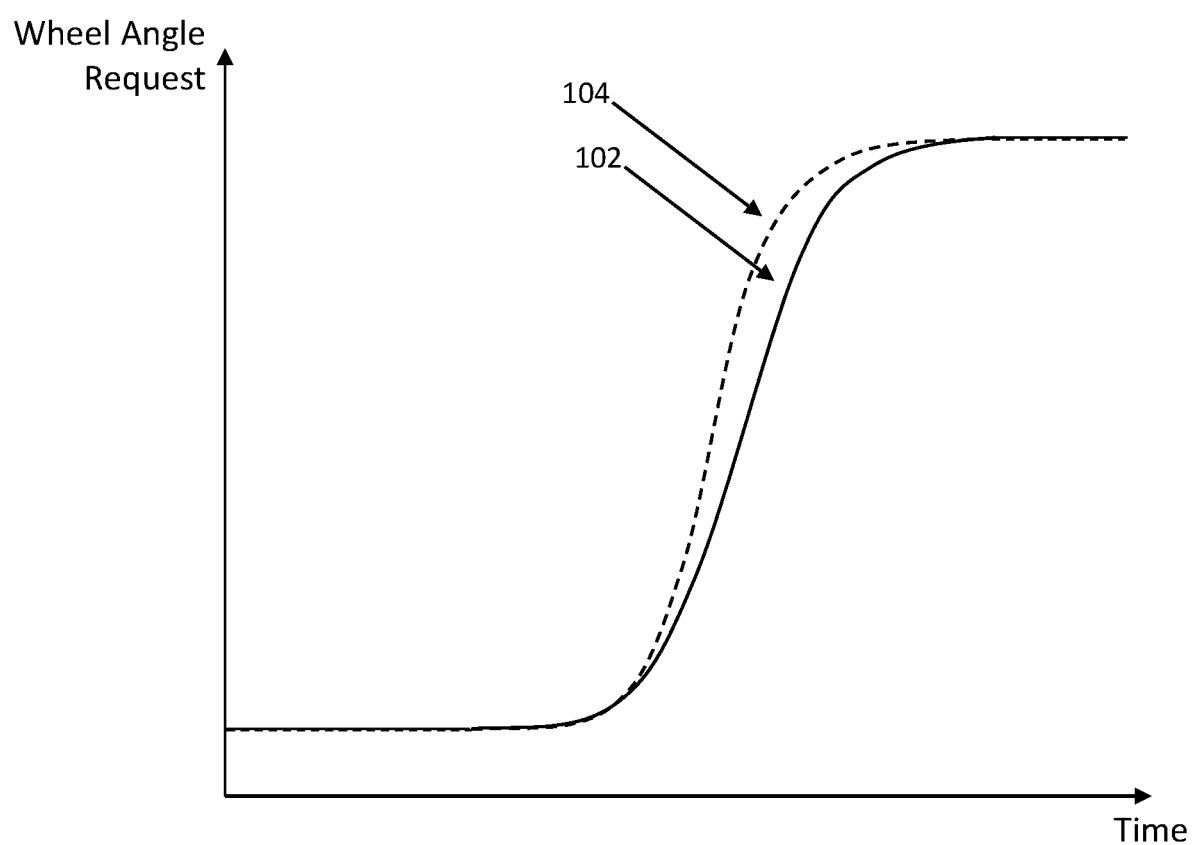
FIG. 3 is a plot illustrating the difference between the step control response of the conventional SBW system and method of FIG. 1 and the SBW system and method of the present disclosure of FIG. 2.

FIG. 3 illustrates the difference between the step control response of the conventional SBW system and method 10 of FIG. 1 102 and the SBW system and method 100 of the present disclosure of FIG. 2 104. It can be seen that a steeper wheel control curve is implemented, indicating enhanced vehicle responsiveness and agility. This responsiveness could be modified under different driving conditions and/or for different driving mode settings by selectively modifying the calculation of the angular offset output 34 (FIG. 2) by the angular rate filter/tuner 30 (FIG. 2) and/or selectively modified the degree to which it is incorporated back into the control signal.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) a tangible computer-readable storage medium that is non-transitory or (2) a communication medium, such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include random-access memory (RAM), read-only memory (ROM), electrically erasable-programmable read-only memory (EEPROM), compact disc read-only memory (CD-ROM) or other optical disc storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared (IR), radio frequency (RF), and microwave, then the coaxial cable, fiber optic cable, twisted pair, DSL, or wireless technologies, such as IR, RF, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

By way of summary, there are different components involved in the forces applied to the driver/driver's hands. The tire friction element involves extremely high frequencies (kHz to MHz). Tire contact patch dynamics can be modeled by the application of several different theories. For example, the Brush model describes the deformation of the tire contact patch and the corresponding force build-up. The deformation velocity is directly dependent on the slip angle and the velocity of the vehicle (for the y-direction, when turning that is). This means that, at higher speeds, one wants to compensate less since the deflection velocity is already fairly high. At lower speeds, some compensation can be done for this effect. Tire sidewall deflection means that the sidewall of the tire deforms when lateral force is applied. This deformation is significantly larger than the tire contact patch deformation and also gives additional response time. This effect can be compensated for by overshooting/phase-leading the steer angle since the sidewall more quickly reach the deflection "position" of the intended steer angle. Finally, vehicle dynamics and suspension involves slow dynamics (up to max 5 Hz, typically below 2 Hz). When trying to compensate for vehicle dynamic behavior on this level, it is difficult to do this as the overshoot needs to be relatively large and will provide numerous unwanted effects. So, in this context, the present disclosure does not look to compensate for the dynamic behaviors of the vehicle body (roll and mass transfer, for example). Rather, the present disclosure ideally compensates for tire contact patch dynamics and tire sidewall deflection.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

The invention claimed is:

1. A steer-by-wire system for a vehicle, comprising:
a steering wheel system comprising a steering wheel by which a vehicle operator steers one or more wheels of the vehicle, an angle sensor or mechanism coupled or applied to the steering wheel and adapted to determine a directed angular magnitude of the steering wheel itself and provide a corresponding control signal indicative of a vehicle operator steering intention, and an angular rate sensor or mechanism coupled or applied to the steering wheel and adapted to determine a directed angular rate of the steering wheel itself and provide a corresponding control signal offset also indicative of the vehicle operator steering intention; and
a steering actuator system comprising a wheel angle actuator coupled to the one or more wheels of the vehicle and adapted to receive the control signal and control signal offset from the steering wheel system and turn the one or more wheels responsive to the control signal and control signal offset, thereby affecting a responsiveness of the one or more wheels to a vehicle operator request at the steering wheel as obtained from the directed angular magnitude of the steering wheel and the directed angular rate of the steering wheel.

2. The steer-by-wire system of claim 1, wherein the steering wheel system further comprises an angular rate filter/tuner adapted to receive an angular rate input from the angular rate sensor or mechanism and derive an angular offset output corresponding to the control signal offset from the angular rate input.

3. The steer-by-wire system of claim 2, wherein the angular rate filter/tuner comprises a tunable feedforward filter.

4. The steer-by-wire system of claim 1, wherein the steering actuator system further comprises a wheel camber actuator coupled to one or more wheels of the vehicle and adapted to receive the control signal and control signal offset from the steering wheel system and camber the one or more wheels responsive to the control signal and control signal offset.

5. The steer-by-wire system of claim 2, wherein the angular rate filter/tuner is further adapted to modify the control signal offset based on a selected driving mode of the vehicle.

6. A computer-readable medium having instructions stored thereon that, when executed by a processor, cause the processor to perform the steps comprising:
receiving a directed angular magnitude of a steering wheel of a vehicle by which a vehicle operator steers one or more wheels of the vehicle determined using an angle sensor or mechanism coupled or applied to the steering wheel itself and providing a corresponding control signal indicative of a vehicle operator steering intention;
receiving a directed angular rate of the steering wheel determined using an angular rate sensor or mechanism coupled or applied to the steering wheel itself and providing a corresponding control signal offset also indicative of the vehicle operator steering intention; and actuating a wheel angle actuator coupled to the one or more wheels of the vehicle using the control signal and control signal offset to turn the one or more wheels responsive to the control signal and control signal offset, thereby affecting a responsiveness of the one or more wheels to a vehicle operator request at the steering wheel as obtained from the directed angular magnitude of the steering wheel and the directed angular rate of the steering wheel.

7. The computer-readable medium of claim 6, wherein the instructions comprise an angular rate filter/tuner algorithm adapted to receive an angular rate input from the angular rate sensor or mechanism and derive an angular offset output corresponding to the control signal offset from the angular rate input.

8. The computer-readable medium of claim 7, wherein the angular rate filter/tuner algorithm comprises a tunable feedforward filter algorithm.

9. The computer-readable medium of claim 6, wherein the steps further comprise:
actuating a wheel camber actuator coupled to the one or more wheels using the control signal and control signal offset to camber the one or more wheels responsive to the control signal and control signal offset.

10. The computer-readable medium of claim 7, wherein the angular rate filter/tuner algorithm is further adapted to modify the control signal offset based on a selected driving mode of the vehicle.

11. A steer-by-wire method for a vehicle, comprising:
receiving a directed magnitude parameter of a steering control of the vehicle by which a vehicle operator steers one or more wheels of the vehicle determined using a magnitude parameter sensor or mechanism coupled or applied to the steering control itself and providing a corresponding control signal indicative of a vehicle operator steering intention;
receiving a directed rate parameter of the steering control determined using a rate parameter sensor or mechanism coupled or applied to the steering control itself and providing a corresponding control signal offset also indicative of the vehicle operator steering intention; and
actuating a wheel angle actuator coupled to the one or more wheels of the vehicle using the control signal and control signal offset to turn the one or more wheels responsive to the control signal and control signal offset, thereby affecting a responsiveness of the one or more wheels to a vehicle operator request at the steering control as obtained from the directed magnitude parameter of the steering control and the directed rate parameter of the steering control.

12. The steer-by-wire method of claim 11, further comprising, using a rate parameter filter/tuner algorithm, receiving rate parameter input from the rate parameter sensor or mechanism and deriving rate parameter offset output corresponding to the control signal offset from the rate parameter input.

13. The steer-by-wire method of claim 12, wherein the rate parameter filter/tuner algorithm comprises a tunable feedforward filter algorithm.

14. The steer-by-wire method of claim 11, further comprising:
actuating a wheel camber actuator coupled to the one or more wheels using the control signal and control signal offset to camber the one or more wheels responsive to the control signal and control signal offset.

15. The steer-by-wire method of claim 12, wherein the rate parameter filter/tuner algorithm is further adapted to modify the control signal offset based on a selected driving mode of the vehicle.

16. The steer-by-wire method of claim 11, wherein the magnitude parameter is one of an angular magnitude parameter and a linear magnitude parameter.

17. The steer-by-wire method of claim 11, wherein the rate parameter is one of an angular rate parameter and a linear rate parameter.

18. The steer-by-wire system of claim 1, wherein the directed angular rate of the steering wheel is applied by the vehicle operator.

19. The computer-readable medium of claim 6, wherein the directed angular rate of the steering wheel is applied by the vehicle operator.

20. The steer-by-wire method of claim 11, wherein the directed rate parameter of the steering control is applied by the vehicle operator.

* * * * *